US008954515B2

(12) United States Patent
Guo et al.

(10) Patent No.: US 8,954,515 B2
(45) Date of Patent: Feb. 10, 2015

(54) METHOD AND APPARATUS FOR REDUCING APPLICATION UPDATE TRAFFIC IN CELLULAR NETWORKS

(75) Inventors: Katherine H. Guo, Scotch Plains, NJ (US); Cristian Lumezanu, Arlington, VA (US)

(73) Assignee: Alcatel Lucent, Boulogne-Billancourt (FR)

(*) Notice: Subject to any disclaimer, the term of this patent is extended or adjusted under 35 U.S.C. 154(b) by 931 days.

(21) Appl. No.: 12/826,955

(22) Filed: Jun. 30, 2010

(65) Prior Publication Data

US 2012/0005276 A1 Jan. 5, 2012

(51) Int. Cl.
*G06F 15/16* (2006.01)
*H04L 29/08* (2006.01)
*G06F 17/30* (2006.01)

(52) U.S. Cl.
CPC ...... *H04L 67/2828* (2013.01); *G06F 17/30902* (2013.01); *H04L 67/34* (2013.01); *H04L 67/2861* (2013.01); *H04L 67/2833* (2013.01)
USPC ......... 709/206; 379/93.01; 709/233; 709/241

(58) Field of Classification Search
CPC . H04L 67/2828; H04L 67/34; H04L 67/2861; H04L 67/2833; G06F 17/30902
USPC ....................................................... 709/206
See application file for complete search history.

(56) References Cited

U.S. PATENT DOCUMENTS 6,636,898 B1 * 10/2003 Ludovici et al. ............. 709/250
6,772,226 B1 * 8/2004 Bommareddy et al. ...... 709/245
2002/0124090 A1 * 9/2002 Poier et al. ................... 709/228
2004/0078621 A1 * 4/2004 Talaugon et al. ................. 714/4
2005/0235044 A1 * 10/2005 Tazuma ........................ 709/217

(Continued)

FOREIGN PATENT DOCUMENTS

WO WO 01/56251 A2 8/2001
WO WO 2008/002301 A1 1/2008

OTHER PUBLICATIONS

"Efficient and Transparent Dynamic Content Updates for Mobile Clients", ACM, 2 Penn Plaza, Suite 701—New York USA., Jun. 17, 2006-Jun. 21, 2006, XP040040177.*

(Continued)

*Primary Examiner* — Jude Jean Gilles
*Assistant Examiner* — Jaren M Means
(74) *Attorney, Agent, or Firm* — Wall & Tong, LLP

(57) ABSTRACT

An application proxy is disposed between a user device and an application server. The application server supports an application that is available on the user device. The user device registers with the application proxy for the application. The user device is prevented from transmitting application update request messages to the application server. The application proxy transmits application update request messages to the application server on behalf of the user device. The application proxy receives application update response messages from the application server. The application proxy determines, based on the application update response messages from the application server, whether to send an application update notification message toward the user device. In this manner, application update traffic normally transmitted via the network between the user device and the application proxy is reduced. The application update request and response messages may be polling messages, keep-alive messages, and the like.

20 Claims, 4 Drawing Sheets

(56) References Cited

U.S. PATENT DOCUMENTS

| | | | |
|---|---|---|---|
| 2006/0242305 A1 | 10/2006 | Alnas | |
| 2007/0260674 A1 | 11/2007 | Shenfield | |
| 2009/0089873 A1* | 4/2009 | Hepburn | 726/12 |
| 2011/0063992 A1* | 3/2011 | Weng et al. | 370/252 |

OTHER PUBLICATIONS

N. T. Spring and D. Wetherall, "A Protocol-Independent Technique for Eliminating Redundant Network Traffic," in Proc. SIGCOMM, 2000.

S. Schleimer, D. S. Wilkerson and A. Aiken, "Winnowing: Local Algorithms for Document Fingerprinting," in Proc. SIGMOD, 2003.

H. Haverinen, J. Siren and P. Eronen, "Energy Consumption of Always-On Applications in WCDMA Networks," In Proc. IEEE VTC 2007—Spring.

O. Honda et al., "Understanding TCP Over TCP: Effects of TCP Tunneling on End-to-End Throughput and Latency," In Proc. SPIE—vol. 6011, 2006.

O. Titz, "Why TCP Over TCO is a Bad Idea," http://sites.inka.de/~W1011/devel/tcp-tcp.html, 2001.

A. Huttunen et al., "UDP Encapsulation for IPSec ESP Packets," RFC 3948, 2005.

P. Eronen, "TCP Wake-Up: Reducing Keep-Alive Traffic in Mobile IPv4 and IPSec NAT Traversal," Nokia Tech Report, 2008.

Mar. 22, 2012 The International Search Report and the Written Opinion of the International Searching Authority, Or the Declaration in PCT/US2011/041959, Alcatel Lucent Applicant, 13 pages.

"Efficient and Transparent Dynamic Content Updates for Mobile Clients", ACM, 2 Penn Plaza, Suite 701—New York USA, Jun. 17, 2006-Jun. 21, 2006, XP040040177.

\* cited by examiner

METHOD AND APPARATUS FOR REDUCING APPLICATION UPDATE TRAFFIC IN CELLULAR NETWORKS

FIELD OF THE INVENTION

The invention relates generally to cellular networks and, more specifically but not exclusively, to reducing application update traffic in cellular networks.

BACKGROUND

As more and more users register for and use mobile services, and new applications requiring high speed data delivery are deployed, bandwidth requirements for cellular networks continue to grow. Unfortunately, while the capacity of cellular networks is increasing, the existing capacity is insufficient to meet the growing demand for bandwidth. In many cellular networks, in order to better utilize the existing capacity of the cellular networks and, thus, improve user experience for users accessing mobile services, traffic redundancy elimination schemes are being used to reduce the amount of redundant traffic transported within the cellular networks. Disadvantageously, however, existing traffic redundancy elimination schemes fail to address many of the types of redundant traffic currently transported via wireless networks.

SUMMARY

Various deficiencies in the prior art are addressed by embodiments for reducing application update traffic in cellular networks.

In one embodiment, an application proxy is disposed between a user device and an application server. The application server supports an application that is available on the user device. The user device registers with the application proxy for the application. The user device is prevented from transmitting application update request messages to the application server. The application proxy transmits application update request messages to the application server on behalf of the user device. The application proxy receives application update response messages from the application server. The application proxy determines, based on the application update response messages from the application server, whether to send an application update notification message toward the user device. In this manner, application update traffic normally transmitted via the network between the user device and the proxy server is reduced. The application update request messages and response messages may be polling messages, keep-alive messages, and the like.

In one embodiment, a method for reducing application update traffic in a network includes transmitting an application update request message from an application proxy toward an application server on behalf of a user device, receiving an application update response message of the application server at the application proxy, and determining, based on the application update response message, whether to transmit an application update notification message toward the user device. The application update request and response messages are associated with an application supported by the application server and available on the user device.

In one embodiment, a method for reducing application update traffic in a network includes preventing, at a user device, transmission of an application update request message that would normally be transmitted from the user device to an application server for an application supported by the application server and available on the user device.

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

An application update traffic reduction capability is depicted and described herein. The application update traffic reduction capability is adapted for reducing application update traffic transported within cellular networks, thereby reducing traffic volume within cellular wireless networks and, thus, increasing bandwidth of the cellular networks available for supporting other types of traffic (e.g., user content, control signaling, and the like). In this manner, the application update traffic reduction capability improves the quality of experience for all users. Although primarily depicted and described herein with respect to use of the application update traffic reduction capability to reduce application update traffic in cellular networks, the application update traffic reduction capability may be used to reduce application update traffic in other types of networks (e.g., other types of wireless networks, wireline networks, and the like).

Figure 1:
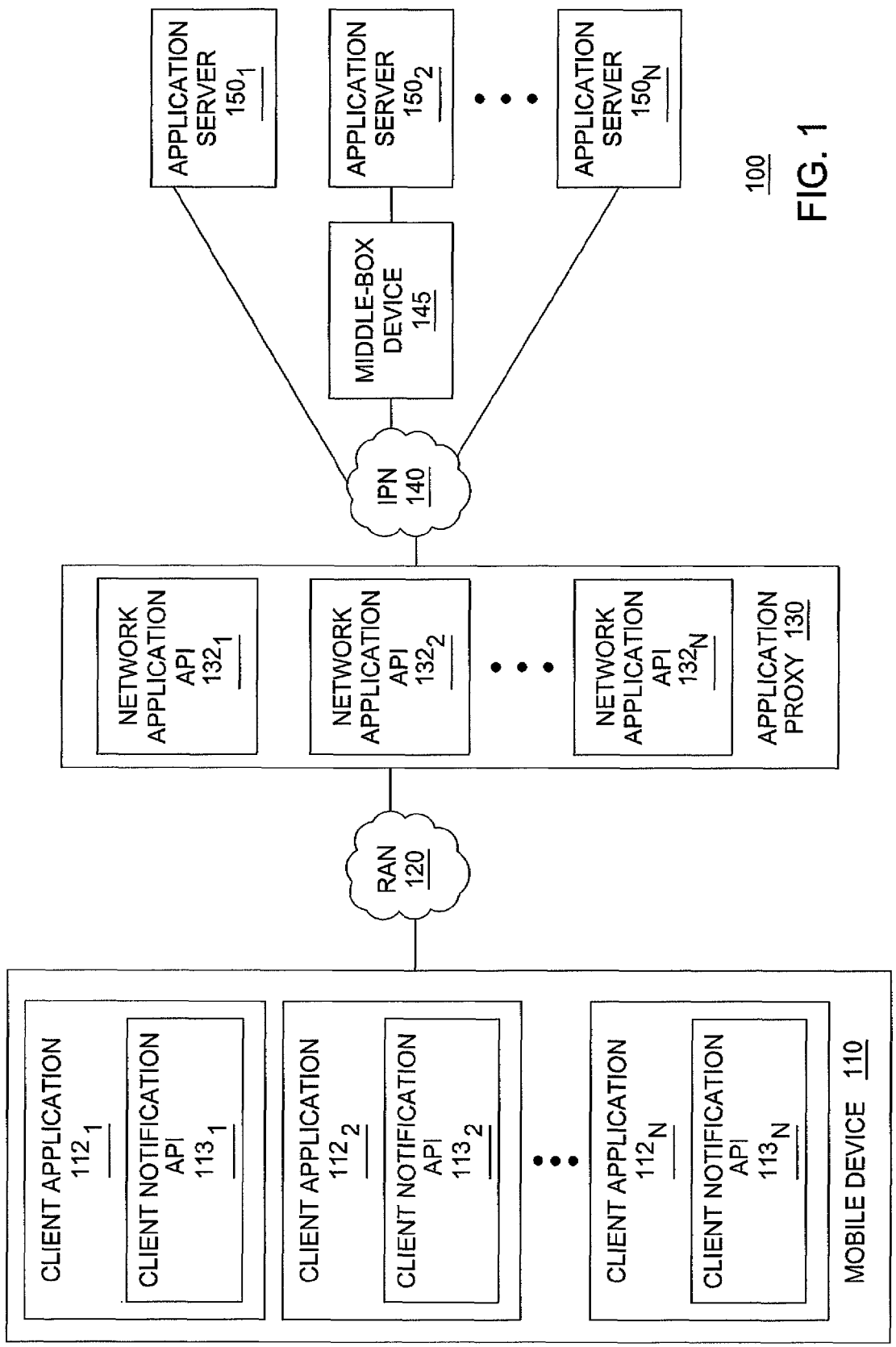
FIG. 1 depicts a high-level block diagram of an exemplary cellular communication system.

FIG. 1 depicts a high-level block diagram of an exemplary cellular communication system. As depicted in FIG. 1, cellular communication system 100 includes a mobile device (MD) 110, a radio access network (RAN) 120, an application proxy (AP) 130, an Internet Protocol (IP) network (IPN) 140, and a plurality of application servers (ASs) $150_1$-$150_N$ (collectively, ASs 150).

As depicted in FIG. 1, MD 110 accesses and utilizes applications supported by ASs 150, where communication between MD 110 and ASs 150 is supported via RAN 120 and IPN 140.

The MD 110 is a mobile device configured for accessing and utilizing applications via a cellular communication system. The MD 110 may be any device that is suitable for accessing and utilizing applications via a cellular communication system, such as a smartphone, a personal digital assistant (PDA), a cellular phone, a computer, and the like.

The MD 110 supports a plurality of client applications $112_1$-$112_N$ (collectively, client applications 112) including a plurality of client notification application programming interfaces (APIs) $113_1$-$113_N$ (collectively, client notification APIs 113), respectively.

The client applications $112_1$-$112_N$ include application functionality adapted for enabling the MD 110 to run a plurality of applications hosted by ASs $150_1$-$150_N$, respectively.

The typical operation of client applications $112_1$-$112_N$ for utilizing applications hosted by ASs $150_1$-$150_N$, respectively, will be understood by one skilled in the art.

The client notification APIs $113_1$-$113_N$ are adapted for supporting application update communications between client applications $112_1$-$112_N$ and ASs $150_1$-$150_N$, respectively. The application update communications typically exchanged between client notification APIs $113_1$-$113_N$ and ASs $150_1$-$150_N$, respectively (in the absence of the application update traffic reduction capability), will be understood by one skilled in the art.

As described herein, in various embodiments of the application update traffic reduction capability, client applications 112 may be configured in a manner adapted for reducing the amount of application update traffic that is exchanged between client applications $112_1$-$112_N$ and ASs $150_1$-$150_N$ for the associated applications, respectively. In at least some such embodiments, the client notification APIs 113 of the client applications 112, respectively, may be configured in a manner adapted for reducing the amount of application update traffic that is exchanged between client applications $112_1$-$112_N$ and ASs $150_1$-$150_N$ for the associated applications, respectively. In one embodiment, for example, client applications 112 are configured to prevent initiation of application update request messages to ASs 150 (as application update request messages will be initiated by the AP 130 on behalf of the MD 110).

Figure 2:
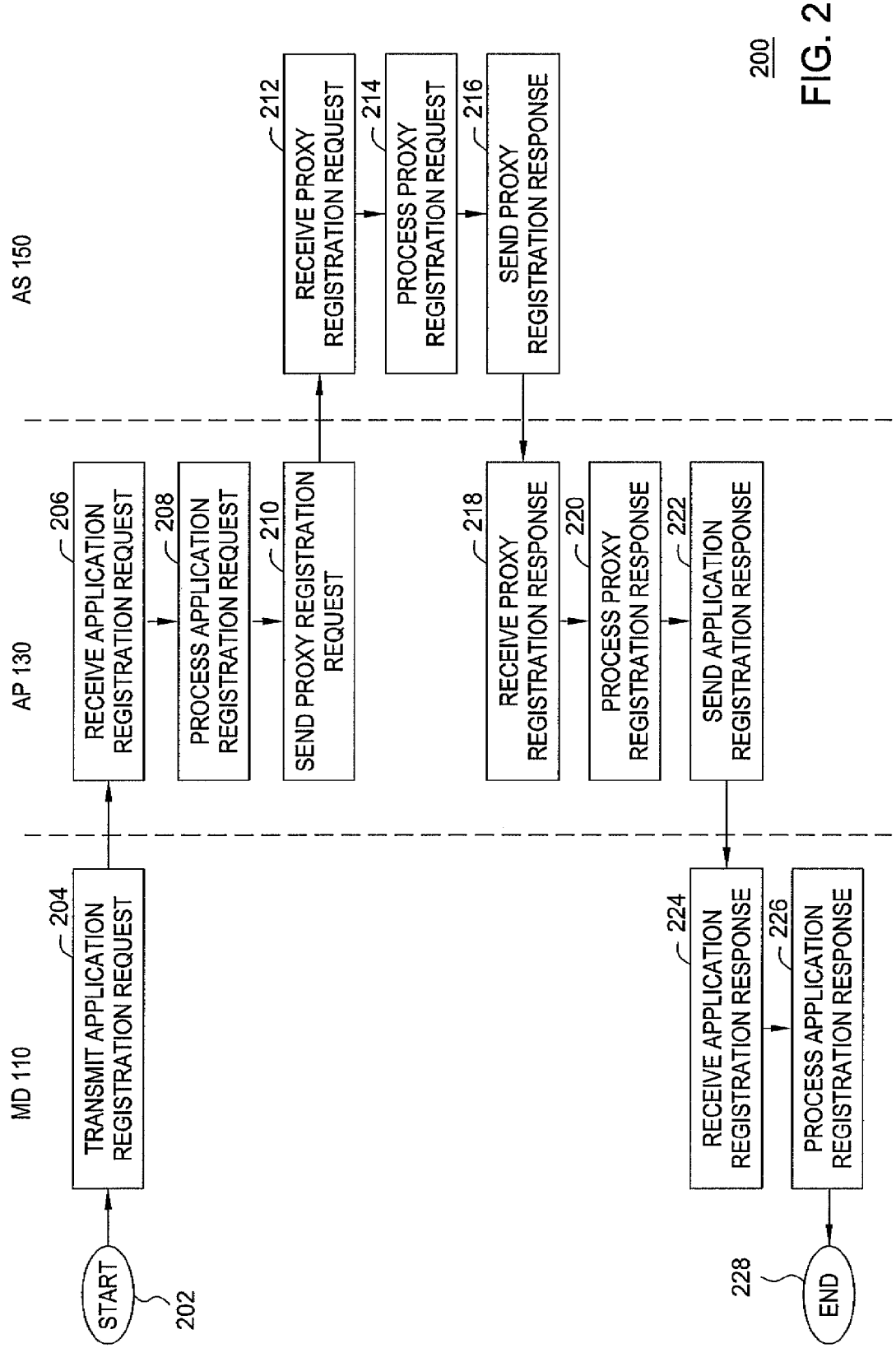
FIG. 2 depicts one embodiment of a method for registering one of the application clients of the mobile device of FIG. 1 with one of the network application APIs of the application proxy of FIG. 1.
Figure 3:
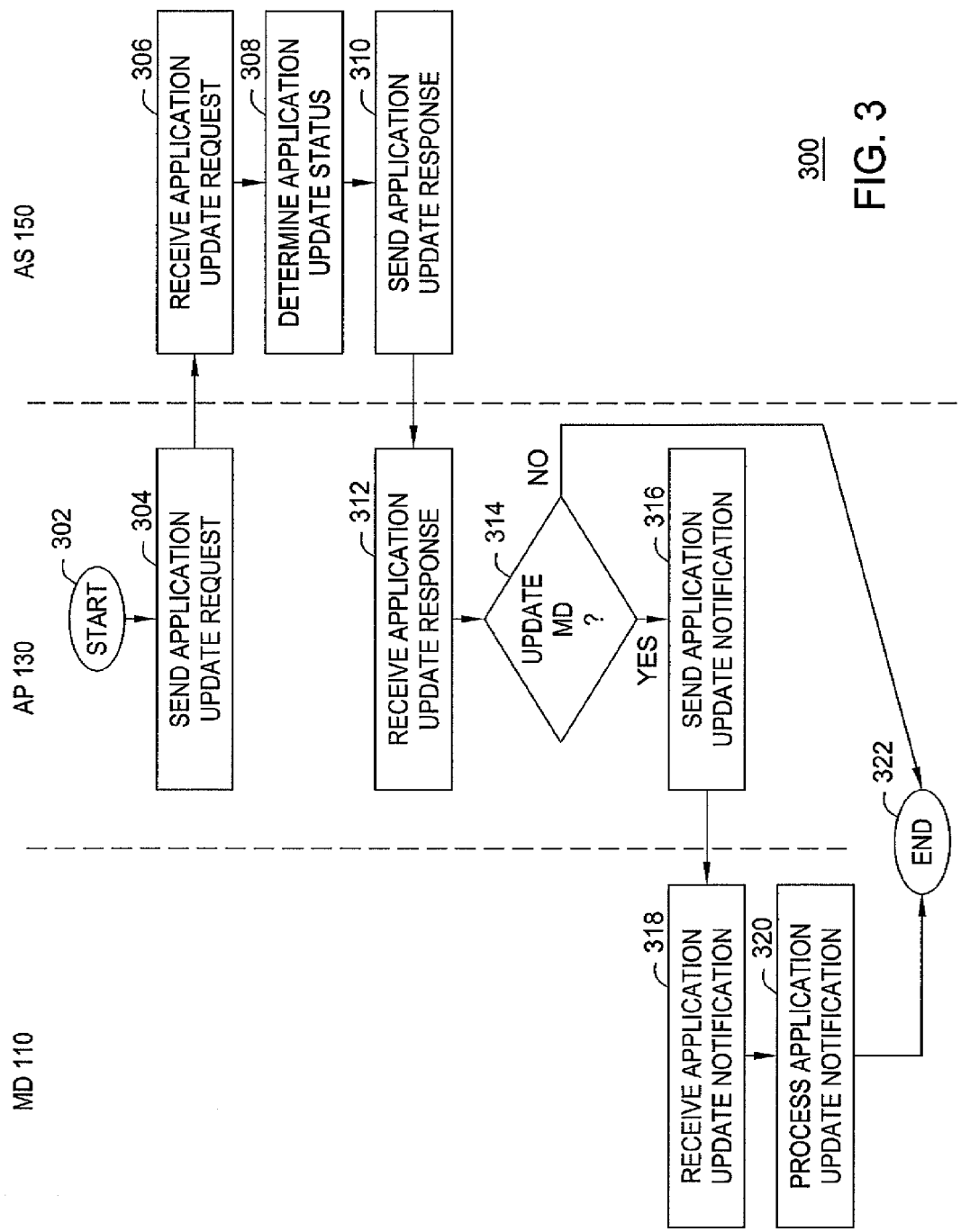
FIG. 3 depicts one embodiment of a method for using the application proxy of FIG. 1 in a manner for reducing application update traffic exchanged within the RAN of FIG. 1.

The operation of client applications $112_1$-$112_N$, and associated client notification APIs $113_1$-$113_N$, in providing various functions of the application update traffic reduction capability may be better understood by way of reference to FIGS. 2 and 3.

The ASs 150 include application servers that host applications which may be accessed and utilized by MD 110 (as well as various other devices).

As described herein, the MD 110 accesses and utilizes applications hosted by ASs 150. The applications hosted by ASs 150 and accessed and utilized by the user via MD 110 may include any applications for which use of the application update traffic reduction capability is suitable. For example, the applications may include email applications, Internet poll applications (e.g., applications that poll for news updates, stock tickers, and the like), instant messaging (IM) applications, social networking applications (e.g., Facebook, Twitter, and the like), Really Simple Syndication (RSS) applications, persistent connection applications (e.g., virtual private network (VPN) applications, mobility applications, and like applications associated with maintaining persistent network connections), and the like, as well as various combinations thereof. The hosting of such applications on ASs 150, and typical accessing and utilization of such applications via MD 110, will be understood by one skilled in the art.

As depicted in FIG. 1, communication between MD 110 and ASs 150 is provided using cellular communication network technologies, including RAN 120 and IPN 140.

The RAN 120 and IPN 140 include any suitable radio access networks and IP networks, respectively. As such, RAN 120 and IPN 140 may be implemented using any suitable cellular technologies, such as Code Division Multiple Access (CDMA), Universal Mobile for Telecommunications Systems (UMTS), Worldwide Interoperability of Microwave Access (WiMAX), and the like, as well as various combinations thereof.

In one embodiment, for example, in which RAN 120 and IPN 140 are implemented as a CDMA wireless communication network, RAN 120 includes network elements typically deployed within CDMA-based RANs (e.g., base stations (BS) providing a wireless interface for MD 110, one or more Radio Network Controllers (RNCs), and the like) and IPN 140 includes network elements typically deployed for interfacing the RAN 120 to the Internet (e.g., one or more Packet Data Serving Nodes (PDSNs) connected to the RNC(s) of RAN 120, a Home Agent (HA) connected to the PDSN(s), and the like).

In one embodiment, for example, in which RAN 120 and IPN 140 are implemented as a Third Generation (3G) UMTS wireless communication network, RAN 120 includes network elements typically deployed within 3G UMTS-based RANs (e.g., NodeBs providing a wireless interface for MD 110, one or more Radio Network Controllers (RNCs), and the like) and IPN 140 includes network elements typically deployed for interfacing the RAN 120 to the Internet (e.g., one or more Serving GPRS Support Nodes (SGSNs) connected to the RNC(s) of RAN 120, a Gateway GPRS Support Node (GGSN) connected to the SGSN(s), and the like).

In one embodiment, for example, in which RAN 120 and IPN 140 are implemented as a Fourth Generation (4G) UMTS wireless communication network (e.g., Long Term Evolution (LTE) network), RAN 120 includes network elements typically deployed within 4G LTE-based RANs (e.g., eNodeBs providing a wireless interface for MD 110, one or more Serving Gateways (SGWs), one or more Mobility Management Entities (MMEs), and the like) and IPN 140 includes network elements typically deployed for interfacing the RAN 120 to the Internet (e.g., one or more PDN Gateways (PGW) connected to the SGW(s)/MME(s) of RAN 120 and the like).

In one embodiment, for example, in which RAN 120 and IPN 140 are implemented as a WiMAX wireless communication network, RAN 120 includes network elements typically deployed within WiMAX-based RANs (e.g., base station (BSs) providing a wireless interface for MD 110, one or more Access Service Network Gateways (ASN-GWs and the like) and IPN 140 includes network elements typically deployed for interfacing the RAN 120 to the Internet (e.g., one or more Home Agents (HAs) connected to the ASN-GW(s) of RAN 120 and the like).

The typical configuration of such wireless communication networks will be understood by one skilled in the art.

Although primarily described with respect to utilizing the application update traffic reduction capability within specific types and configurations of cellular communication networks, it will be appreciated that the application update traffic reduction capability may be utilized within various other types and/or configurations of cellular communication networks.

As described herein, the MD 110 typically accesses and utilizes the applications hosted by the ASs 150 by exchanging application traffic with ASs 150 via RAN 120 and IPN 140.

The application traffic may include traffic such as application login messages (e.g., messages exchanged between MD 110 and ASs 150 for enabling the user to login to the associated applications using MD 110), application content request messages (e.g., messages initiated by MD 110 to ASs 150 for requesting content from the ASs 150), and application content (e.g., application content provided from ASs 150 to MD 110 to provide application content to the user of the MD 110, such as application content pushed by the ASs 150 to MD 110 and/or provided by the ASs 150 to MD 110 in response to application content requests received from MD 110), and the like, as well as various combinations thereof.

The application traffic also may include, for at least some types of applications, application update traffic. In general, application update traffic of an application, for a client application 112 of MD 110, includes traffic adapted enabling the client application 112 of MD 110 to learn the current state of the application for the associated user, thereby enabling the client application 112 of MD 110 to remain or become synchronized with the application hosted on the associated AS 150.

It will be appreciated that the types of application traffic exchanged for applications may vary across applications.

As described herein, in various embodiments of the application update traffic reduction capability, AP 130 is configured such that at least a portion of the application traffic that is typically exchanged between MD 110 and ASs 150 is instead exchanged between AP 130 and AS 150, with AP 130 handling such application traffic exchanges on behalf of MD 110. In one embodiment, AP 130 is configured such that at least a portion of the application update traffic that is typically exchanged between MD 110 and ASs 150 is instead exchanged between AP 130 and AS 150, with AP 130 handling the application update traffic exchanges on behalf of MD 110.

The types of application update traffic used for enabling the client application 112 of the MD 110 to learn the current state of the application may vary across applications.

For example, application update traffic may include traffic associated with application polling, whereby an AS 150 is polled using application polling messages for determining whether there is any new content available for the client application 112 of the MD 110 at the AS 150 (e.g., for e-mail applications, Internet poll applications, social network applications, RSS applications, and the like).

For example, application update traffic may include traffic associated with application keep-alive messaging, whereby application keep-alive messages are initiated to an AS 150 for maintaining a current connection between MD 110 and AS 150 such that the current connection between MD 110 and AS 150 does not time out (e.g., for IM applications, VPN applications, mobility applications, and any other applications for which connections between clients and servers should be maintained).

In one embodiment, the application keep-alive messages may be initiated to AS 150 for indicating to a middle-box device that the state of the connection between MD 110 and AS 150 should be maintained by the middle-box device, where the middle-box device is located between the MD 110 and the AS 150.

In general, for example, for a connection between a client and a server when the client and/or the server is behind a middle-box device, the client and server may need to exchange keep-alive messages in order to maintain the state of the connection. In some cases, the middle-box device creates a state for the connection where the connection has a timer associated therewith and the state of the connection is removed after the connection becomes idle for some period of time. In some cases, in order to prevent removal of connection states (and, thus, keep connections active), dummy keep-alive messages are periodically exchanged between the client and server in order to reset the timers in the middle-boxes. For example, typical values of state timeout ranges include 30 to 80 seconds for UDP connections, 30-60 minutes for TCP connections, and the like.

As depicted in FIG. 1, an exemplary middle-box device 145 is disposed between MD 110 and AS $150_2$. More specifically, middle-box device 145 is disposed between IPN 140 and AS $150_2$. The middle-box device 145 may be any suitable type of middle-box device (e.g., a Network Address Translation (NAT) device, a stateful firewall, or any other middle-box device), which may depend on the type of application with which the middle-box device 145 is used. Although a single middle-box device 145 is depicted, it will be appreciated that one or more of the other ASs 150 may have middle-box devices associated therewith.

The application keep-alive messages may be initiated to the AS 150 for indicating to the AS 150 that a connection should be maintained on AS 150 for the user.

The application keep-alive messages may be initiated to AS 150 both for indicating to middle-box device 145 that the state of the connection between MD 110 and AS 150 should be maintained by the middle-box device 145 and for indicating to the AS 150 that a connection should be maintained on AS 150 for the user.

The application update traffic may include traffic associated with any other suitable types of application update capabilities.

The application update traffic includes application update messages, which may include application update request messages and application update response messages.

An application update message for an application, in general, is a message adapted for use in enabling the client application 112 on the MD 110 to become or remain synchronized with the AS 150 supporting the application with which the application update message is associated (e.g., for enabling the MD 110 to determine whether or not there is new application content available at the AS 150 for the MD 110 in the case of application polling, to enable the MD 110 to maintain a connection between the AS 150 and the MD 110 such that the connection does not time out in the case of application keep-alive, and the like, as well as combinations thereof).

An application update request message associated with an application of the MD 110 is a request initiated to an AS 150 for requesting an update of the state of the application on the AS 150 for the MD 110.

In one embodiment, for example, an application update request message may include an application polling request message initiated in order to poll the AS 150 for determining whether there is any new application content available for the client application 112 of MD 110. In the absence of the application update traffic reduction capability, the application polling request message would be initiated by the MD 110. In embodiments in which the application update traffic reduction capability is used, the application polling request message is initiated by the AP 130 on behalf of the MD 110.

In one embodiment, for example, an application update request message may include an application keep-alive request message initiated in order to indicate that the state of the connection between the MD 110 and the AS 150 should be maintained. In one embodiment, the application keep-alive request message may be initiated to a middle-box device located between the AP 130 and the AS 150 (e.g., middle-box device 145 located between MD 110 and AS $150_2$) in order to indicate to the middle-box device that the state of the connection between the MD 110 and the AS 150 should be maintained by the middle-box device. In one embodiment, the application keep-alive request message may be initiated to the AS 150 in order to indicate to the AS 150 that the state of the connection between the MD 110 and the AS 150 should be maintained by AS 150. In one embodiment, one or more application keep-alive request messages may be initiated indicate to both the middle-box device and the AS 150 that the state of the connection between the MD 110 and the AS 150 should be maintained. In the absence of the application update traffic reduction capability, the application keep-alive request message would be initiated by the MD 110. In embodiments in which the application update traffic reduction capability is used, the application keep-alive request message is initiated by the AP 130 on behalf of the MD 110.

Any other suitable types of application update request messages may be supported.

An application update response message associated with an application of MD 110 is a response initiated from an AS 150, in response to an application update request message associated with the MD 110. The application update response message is adapted for indicating the state of the application on the AS 150 for the client application 112 of the MD 110.

In one embodiment, for example, an application update response message may include an application polling response message initiated by an AS 150 for the MD 110, which is indicative of whether or not there is new application content available, at the AS 150, for the MD 110. In the absence of the application update traffic reduction capability, the application polling response message initiated by an AS 150 would be propagated to the MD 110. In embodiments in which the application update traffic reduction capability is used, the application polling response message is received by the AP 130 and processed by AP 130 on behalf of the MD 110.

In one embodiment, for example, an application update response message may include an application keep-alive response message initiated by an AS 150 for the MD 110, which is indicative of whether or not the connection is active, at the AS 150, for the MD 110. In the absence of the application update traffic reduction capability, the application keep-alive response message initiated by an AS 150 would be propagated to the MD 110. In embodiments in which the application update traffic reduction capability is used, the application keep-alive response message is received by the AP 130 and processed by AP 130 on behalf of the MD 110.

Any other suitable types of application update response messages may be supported.

The use of such application update messages may be better understood by considering examples associated with specific applications which may be hosted by ASs 150 and accessed and utilized by respective client applications 112 of MD 110.

As an example, consider an email application. In the absence of the application update traffic reduction capability, the associated client application 112 of MD 110 periodically polls the email server for determining whether there are any new emails available for the user of MD 110. In one embodiment, in which the application update traffic reduction capability is used, AP 130 periodically polls the email server on behalf of MD 110 for determining whether there are any new emails available for the user of MD 110.

As an example, consider an Internet poll application providing news updates. In the absence of the application update traffic reduction capability, the associated client application 112 of MD 110 periodically polls the news update server for determining whether there are changes to the news information last provided to the user of MD 110. In one embodiment, in which the application update traffic reduction capability is used, AP 130 periodically polls the news update server on behalf of MD 110 for determining whether there are changes to the news information last provided to the user of MD 110.

As an example, consider an IM application. In the absence of the application update traffic reduction capability, the associated client application 112 of MD 110 periodically polls the IM server for determining whether there are any changes associated with any of the contacts on the contact list of the user of MD 110 (e.g., new contacts logging in, contacts logging out, changes to status messages of contacts, and the like, as well as various combinations thereof). In one embodiment, in which the application update traffic reduction capability is used, AP 130 periodically polls the IM server on behalf of MD 110 for determining whether there are any changes associated with any of the contacts on the contact list of the user of MD 110.

As an example, consider a social networking application such as Facebook. In the absence of the application update traffic reduction capability, the associated client application 112 of MD 110 periodically polls the Facebook server for determining whether there are changes to the content available to the user of MD 110 (e.g., contacts coming online and going offline, changes to news feeds and other types of feeds, and the like, as well as various combinations thereof). In one embodiment, in which the application update traffic reduction capability is used, AP 130 periodically polls the Facebook server on behalf of MD 110 for determining whether there are changes to the content available to the user of MD 110.

As an example, consider a social networking application such as Twitter. In the absence of the application update traffic reduction capability, the associated client application 112 of MD 110 periodically polls the Twitter server for determining whether there are changes to the content available to the user of MD 110 (e.g., for new Tweets published in the account of the user, and like information). In one embodiment, in which the application update traffic reduction capability is used, AP 130 periodically polls the Twitter server on behalf of MD 110 for determining whether there are changes to the content available to the user of MD 110.

As an example, consider an RSS application. In the absence of the application update traffic reduction capability, the associated client application 112 of MD 110 periodically polls the RSS server for determining whether there are changes to the content available to the user of MD 110 (e.g., for new news feeds available to the user, and like information). In one embodiment, in which the application update traffic reduction capability is used, AP 130 periodically polls the RSS server on behalf of MD 110 for determining whether there are changes to the content available to the user of MD 110.

As an example, consider a VPN application in which a middle-box device is used. In the absence of the application update traffic reduction capability, the associated client application 112 of MD 110 periodically sends keep-alive messages to the VPN server such that (1) the middle-box device located between the MD 110 and the VPN server maintains the state of the connection between the user of MD 110 and the VPN server and (2) the VPN server maintains the VPN connection for the user of MD 110. In one embodiment, in which the application update traffic reduction capability is used, AP 130, which is located between MD 110 and the middle-box device (e.g., middle-box device 145 between MD 110 and AS 150₂), periodically sends keep-alive messages to the VPN server on behalf of MD 110 such that (1) the middle-box device, which is located between the AP 130 and the VPN server, maintains the state of the connection between the user of MD 110 and the VPN server and (2) the VPN server maintains the VPN connection for the user of MD 110. The keep-alive messages may be UDP keep-alive messages or other suitable types of keep-alive messages.

As an example, consider a mobility application (e.g., MobileIP, Interactive Protocol for Mobile Networking (IPMN), and the like) in which a middle-box device is used. In the absence of the application update traffic reduction capability, the associated client application 112 of MD 110 periodically sends keep-alive messages to the mobility server such that (1) the middle-box device, which is located between the MD 110 and the mobility server, maintains the state of the connection between the user of MD 110 and the mobility server, and (2) the mobility server maintains the connection for the user of MD 110. In one embodiment, in which the application update traffic reduction capability is used, AP 130, located between the MD 110 and the middle-box device (e.g., middle-box device 145 between MD 110 and AS 150$_2$), periodically sends keep-alive messages to the mobility server on behalf of MD 110 such that (1) the middle-box device, located between the AP 130 and the mobility server, maintains the state of the connection between the user of MD 110 and the mobility server and (2) the mobility server maintains the connection for the user of MD 110. The keep-alive messages may be UDP keep-alive messages or other suitable types of keep-alive messages.

In each of the foregoing examples, associated application update response messages are propagated from the AS 150 receiving the application update request message. In the absence of the application update traffic reduction capability, such application update response messages are propagated to the MD 110. In embodiments in which the application update traffic reduction capability is used, such application update response messages are propagated to AP 130 which processes the application update response messages on behalf of MD 110.

As will be appreciated, the foregoing examples describe application update traffic only for a single mobile device. Thus, considering the number of mobile devices currently utilizing applications via cellular communication networks and, further, the number of applications currently accessible to mobile devices via cellular communication networks, it will be appreciated that the existing cellular communication networks are supporting a high volume of application update traffic. It will be further appreciated that many application update request messages may be initiated by mobile devices at times at which no new application content is available, such that many of application update request messages initiated by mobile devices produce a large amount of redundant traffic within cellular communication networks and, in particular, within the associated RANs serving the cellular communication networks.

As described herein, within the context of cellular communication network 100, reductions in such application update traffic may be realized through use of AP 130.

As described herein, in various embodiments of the application update traffic reduction capability, AP 130 performs functions such as registering applications of MD 110 at AP 130, registering applications of MD 110 with ASs 150 on behalf of MD 110, initiating application update request messages to ASs 150 on behalf of applications of MD 110, monitoring for application update response messages from ASs 150 on behalf of applications of MD 110, notifying applications of MD 110 in response to receiving application update response messages indicative of changes to the application status for the user at the AS 150 (e.g., indications of new application content being available for the MD 110 on ASs 150, indications as to whether or not a connection is still active, and so forth), and the like, as well as various combinations thereof.

In one embodiment, the AP 130 is configured to provide such functions on a per-application basis. In one such embodiment, as depicted in FIG. 1, the AP 130 includes a plurality of network application APIs 132$_1$-132$_N$ (collectively, network application APIs 132) associated with ASs 150$_1$-150$_N$, respectively. The network application APIs 132$_1$-132$_N$ are adapted for supporting the application update traffic reduction capability for applications of client applications 112 of MD 110 and ASs 150$_1$-150$_N$, respectively, and, thus, the network application APIs 132$_1$-132$_N$ are adapted for reducing the amount of application update traffic that is exchanged between client notification APIs 113$_1$-113$_N$ of client applications 112$_1$-112$_N$ and ASs 150$_1$-150$_N$, respectively.

For example, for each of the foregoing examples regarding application update request/response messages exchanged between MD 110 and ASs 150 in the absence of the application update traffic reduction capability, it will be appreciated that AP 130 will eliminate transport of virtually all (or at least a significant portion) of the application update request messages within RAN 120 and will eliminate a significant portion of the application update response messages within RAN 120, thereby freeing bandwidth of the RAN 120 which may then be used for transporting other types of traffic.

The operation of AP 130, and associated network application APIs 132$_1$-132$_N$, in providing various functions of the application update traffic reduction capability may be better understood by way of reference to FIGS. 2 and 3.

The AP 130 may be deployed within cellular communication network 100 in any suitable manner.

In one embodiment, AP 130 may be deployed on one or more of the existing network elements of cellular communication system 100.

In one such embodiment, AP 130 may be deployed at the first network element, in the direction along the path from MD 110 to ASs 150, at which IP is available.

In one embodiment, for example, in which RAN 120 and IPN 140 are implemented as a CDMA wireless communication network, AP 130 may be deployed on the PDSN. In one embodiment, for example, in which RAN 120 and IPN 140 are implemented as a 3G UMTS wireless communication network, AP 130 may be deployed on the SGSN or the GGSN. In one embodiment, for example, in which RAN 120 and IPN 140 are implemented as a 4G UMTS wireless communication network (e.g., an LTE network), AP 130 may be deployed on the MME and/or SGW. In one embodiment, for example, in which RAN 120 and IPN 140 are implemented as a WiMAX wireless communication network, AP 130 may be deployed on the ASN.

The AP 130 may be deployed on one or more of the existing network elements of cellular communication system 100 in any other suitable manner.

In one embodiment, as depicted in FIG. 1, AP 130 may be deployed as a standalone element within cellular communication system 100. In such embodiments, AP 130 may be deployed at any suitable location(s) within the cellular communication system 100. In one embodiment, for example, AP 130 may be deployed within the communication path between MD 110 and ASs 150. In one embodiment, for example, AP 130 may be deployed such that it is associated with one or more of the network elements typically forming the path between the MD 110 and the ASs 150. The AP 130 may be deployed as a standalone element in any other suitable manner.

As depicted in FIG. 1, AP 130 is depicted, generally, as being deployed between RAN 120 and IPN 140, which is indicative that AP 130 may be deployed at any location suitable for reducing application update traffic, such as within RAN 120 (e.g., at the edge of the RAN 120 near or closest to IPN 140), within IPN 140 (e.g., at the edge of the IPN 140 closest to RAN 120 or even further within the IPN 140), and the like, as well as various combinations thereof.

Although depicted and described as being a standalone element, the AP 130 may be implemented on any of the existing elements of the wireless communication network in which AP 130 is deployed. Furthermore, although depicted and described as being a single element, AP 130 may be deployed in a distributed manner, with various functions of AP 130 being physically distributed across multiple physical elements in any suitable manner.

FIG. 2 depicts one embodiment of a method for registering one of the application clients of the mobile device of FIG. 1 with one of the network application APIs of the application proxy of FIG. 1. As depicted in FIG. 2, the steps of method 200 are performed by MD 110, AP 130, and an AS 150. Accordingly, although depicted as a single method, it will be appreciated that respective portions of method 200 may be implemented as separate processes running on MD 110, AP 130, and an AS 150, respectively.

At step 202, method 200 begins.

At step 204, MD 110 sends an application registration request to AP 130.

The application registration request is a request of a user of MD 110 to access and use an application. The application is an application that is hosted on the AS 150 and for which MD 110 has an associated client application 112. The application registration request is sent by a client notification API 113 of the client application 112 that is associated with the application.

The application registration request may be sent in response to any suitable trigger condition (e.g., manually in response to a manual request of a user initiated via a user interface of MD 110, automatically in response to launching of the associated application on MD 110, automatically in response to detection of a network connection by MD 110, and the like).

The application registration request includes application registration information suitable for use by the AP 130 in performing functions on behalf of the MD 110.

In one embodiment, for example, application registration information may include authorization information adapted for enabling the AP 130 to login to the AS 150 on behalf of the user of MD 110 (e.g., the application login and password of the user and/or any other suitable authorization information).

In one embodiment, for example, application registration information may include configuration information adapted for enabling the AP 130 to interact with the AS 150 on behalf of the user, which may vary based on factors such as differences in applications, difference in user preferences, and the like. For example, the configuration information may include the polling frequency with which the AP 130 should poll the AS 150 for identifying new application content for the user. For example, the configuration information may include indications of the type of information for which the AP 130 should poll the AS 150 (e.g., polling for changes to user status, polling for changes to news feeds, and the like, as well as various combinations thereof). For example, the configuration information may include the keep-alive frequency with which the AP 130 should send keep-alive messages to the AS 150 for maintaining a connection with the AS 150 on behalf of the MD 110. The configuration information may include any other suitable configuration information which may be specified by and/or via MD 110 for use by AP 130 in interacting with AS 150 on behalf of MD 110.

At step 206, AP 130 receives the application registration request from MD 110.

At step 208, AP 130 processes the application registration request.

The processing of the application registration request may include any suitable processing.

In one embodiment, for example, the AP 130 registers the user of MD 110 locally on AP 130. The registration of the user of MD 110 locally on AP 130 may include any suitable actions. For example, AP 130 may register the user with a network application API 132 of AP 130 that is associated with the application (i.e., the application of the client application 112 on MD 110 and the application server 150). For example, the AP 130 may store at least a portion of the configuration information received in the application registration request (e.g., polling frequency, keep-alive frequency, and the like, as well as any other information which may be used by AP 130 in interfacing with AS 150 on behalf of MD 110). As described with respect to step 220, it will be appreciated that, in addition to or alternatively to registering the user of MD 110 locally on AP 130 in response to receiving the application registration request, the AP 130 may register the user of the MD 110 locally or update a previous registration of the user of the MD 110 locally as part of processing a proxy registration response received at AP 130 from AS 150 at step 220).

In one embodiment, for example, the AP 130 generates a proxy registration request adapted for registering the user with the AS 150. The proxy registration request may include at least a portion of the application registration information included within the application registration request (e.g., authorization information for use by AS 150 in authenticating the user for which the AP 130 is sending the proxy registration request, at least a portion of the configuration information, and the like). The proxy registration request may include any other suitable information which may be provided from AP 130 to AS 150 for use in registering the user of the MD 110 with the AS 150.

The processing of the application registration request may include any other suitable processing.

At step 210, AP 130 sends a proxy registration request to AS 150. The AP 130 sends the proxy registration request to the AS 150 on behalf of the user of MD 110. In one embodiment, the proxy registration request is identical to, or at least substantially similar to, the application registration request (i.e., AP 130 forwards the application registration request to the AS 150). In one embodiment, the proxy registration request is generated by the AP 130 (e.g., using at least a portion of the information from the application registration request).

At step 212, AS 150 receives the proxy registration request.

At step 214, AS 150 processes the proxy registration request. The processing of the proxy registration request may include any suitable processing.

In one embodiment, the processing of the proxy registration request includes actions that would normally be performed had the AS 150 received an application registration request from MD 110, rather than receiving the proxy registration request from AP 130 on behalf of MD 110. For example, processing of the proxy registration request may include performing authentication of the user based on the authentication information included within the proxy registration request (e.g., determining whether the user login and password are valid).

In one embodiment, the processing of the proxy registration request includes actions that would not normally be performed had the AS 150 received an application registration request from MD 110 rather than receiving the proxy registration request from AP 130 on behalf of MD 110. For example, processing of the proxy registration request may include configuring, locally on the AS 150, information associated with the corresponding network application API 132 of the AP 130 such that AS 150 can then communicate with the network application API 132 of AP 130 for the associated user.

The processing of the proxy registration request may include any other suitable processing.

At step 216, AS 150 sends a proxy registration response to AP 130.

The proxy registration response may include any suitable information.

In one embodiment, the proxy registration response may include information that would normally be provided to MD 110 had the AS 150 received an application registration request from MD 110, rather than receiving the proxy registration request from AP 130 on behalf of MD 110. For example, the proxy registration response may include an indication as to whether authentication of the user at AS 150 was successful or unsuccessful.

In one embodiment, the proxy registration response may include information that would not normally be provided to MD 110 had the AS 150 received an application registration request from MD 110, rather than receiving the proxy registration request from AP 130 on behalf of MD 110. For example, the proxy registration response may include an indication as to whether association of the network application API 132 of AP 130 with the AS 150 on behalf of the user of MD 110 was successful or unsuccessful.

The proxy registration response may include any other suitable information.

At step 218, AP 130 receives the proxy registration response. The proxy registration response is received by the network application API 113 associated with AS 150.

At step 220, AP 130 processes the proxy registration response.

The processing of the proxy registration response may include any suitable processing.

In one embodiment, for example, the AP 130 registers the user of MD 110 locally on AP 130. For example, the AP 130 may register the user with a network application API 132 of AP 130 that is associated with the application (i.e., the application of the client application 112 on MD 110 and the application server 150). For example, the AP 130 may store at least a portion of the configuration information received in the application registration request (e.g., polling frequency, keep-alive frequency, and the like, as well as any other information which may be used by AP 130 in interfacing with AS 150 on behalf of MD 110) and/or at least a portion of the information stored in the proxy registration response (e.g., session information adapted for use by AP 130 in communicating with AS 150 on behalf of MD 110 and the like). As described with respect to step 208, it will be appreciated that, in addition to or alternatively to registering the user of MD 110 locally on AP 130 in response to receiving the proxy registration response, the AP 130 may register the user of the MD 110 locally as part of the processing of the application registration request received at AP 130 from MD 110 at step 208).

In one embodiment, for example, the AP 130 generates an application registration response adapted for providing, to the MD 110, an indication as to whether registration of the user with AP 130 for the application was successful or unsuccessful. The application registration response may include any other suitable information.

The processing of the proxy registration response may include any other suitable processing.

At step 222, AP 130 sends an application registration response to MD 110. In one embodiment, the application registration response is identical to, or at least substantially similar to, the proxy registration response (i.e., AP 130 forwards the proxy registration response to the MD 110). In one embodiment, the application registration response is generated by the AP 130 (e.g., using at least a portion of the information from the proxy registration response).

At step 224, MD 110 receives the application registration response. The application registration response is received by the client notification API 113 of the client application 112 associated with AS 150.

At step 226, MD 110 processes the application registration response.

The processing of the application registration response may include any suitable processing.

In one embodiment, in response to a determination from the application registration response that registration of the user for the application was successful, MD 110 configures the client application 112 to prevent initiation of application update messages that would normally be initiated by the client application 112 (e.g., polling messages, keep-alive messages, and the like), thereby reducing the amount of application update traffic that is transported within RAN 120.

The manner of configuring a client application 112 to prevent initiation of application update messages that would normally be initiated by the client application 112 may vary across applications.

For example, in the case of a social networking application such as Twitter, the client application 112 is configured to prevent initiation of request messages for determining whether new Tweets have been published in the account of the user.

For example, in the case of a VPN application, the client application 112 is configured to intercept and drop any UDP keep-alive message initiated on MD 110, the IKE protocol may be configured to prevent sending of keep-alive messages that would otherwise be sent in accordance with the IKE protocol, and the like.

In one embodiment, in response to a determination from the application registration response that registration of the user for the application was unsuccessful, MD 110 may present an indication that registration was not successful, automatically initiate a registration request directly to AS 150 (e.g., bypassing use of AP 130 where login to the AS 150 was unsuccessful when the AP 130 was used), and the like, as well as various combinations thereof.

The processing of the application registration response may include any other suitable processing.

At step 228, method 200 ends.

Although omitted for purposes of clarity, it will be appreciated that any suitable type of communications protocols and technologies may be used to transport the various messages depicted and described with respect to FIG. 2.

Although depicted and described with respect to embodiments in which the application registration request sent by MD 110 targets the AP 130, in other embodiments the application registration request sent by MD 110 may target AS 150 (e.g., where the AP 130 is transparent to MD 110). In such embodiments, the AP 130 may be configured to intercept the application registration request sent by MD 110 such that AP 130 may register with AS 150 on behalf of MD 110.

Although depicted and described with respect to embodiments in which the user is not currently logged into the application at the time at which the application registration request is initiated, in other embodiments the user may be logged into the application at the time at which the application registration request is initiated. In such embodiments, at least a portion of steps 210-220 may be omitted (i.e., the client application 112 of MD 110 merely registers with the associated network application API 132 of AP 130 such that network application API 132 may then interact with the AS 150 on behalf of MD 110).

Although omitted for purposes of clarity, it will be appreciated that a similar series of steps may be performed for deregistering the application client 112 of MD 110 from AP 130. The deregistering of the application client 112 of MD 110 from AP 130 may or may not be performed in conjunction with the user logging out of the application (i.e., the user may continue to utilize the application, but without AP 130 performing functions on behalf of MD 110).

In this manner, AP 130 is configured to perform functions on behalf of MD 110 (e.g., sending application update request messages, processing of application update response messages, and the like) and MD 110 is configured to prevent initiation of application update request messages. The operation of MD 110, AP 130, and AS 150 in performing application update functions is depicted and described herein with respect to FIG. 3.

FIG. 3 depicts one embodiment of a method for using the application proxy of FIG. 1 in a manner for reducing application update traffic exchanged within the RAN of FIG. 1. As depicted in FIG. 3, steps of method 300 are performed by MD 110, AP 130, and an AS 150. Accordingly, although depicted as a single method, it will be appreciated that respective portions of method 300 may be implemented as separate processes running on MD 110, AP 130, and an AS 150, respectively.

At step 302, method 300 begins.

At step 304, AP 130 sends an application update request to AS 150.

The application update request is adapted for enabling AP 130 to interact with AS 150 on behalf of MD 110. The application update request is a request associated with an application hosted on AS 150 and available on MD 110. The application update request is initiated by a network application API 132 of AP 130. The application update request is initiated by AP 130 such that MD 110 does not have to initiate the application update request, thereby eliminating the need for the application update request to be transported via RAN 120. The application update request is adapted for indicating to AS 150 that the request is associated with the corresponding client application 112 (user) of MD 110.

The application update request may be any suitable type of request (e.g., an application polling request whereby AP 130 polls AS 150 on behalf of MD 110 for determining whether there is any new content available for MD 110 at AS 150, an application keep-alive request whereby AP 130 sends a keep-alive message to AS 150 on behalf of MD 110 for maintaining a current connection with the AS 150 such that the current connection does not time out, and the like).

The application update request may be initiated in response to any suitable trigger condition (e.g., expiration of a polling/keep-alive timer maintained on AP 130 for that user for that application, receipt by AP 130 of a message indicating that the application update request should be initiated, and the like, as well as various combinations thereof).

At step 306, AS 150 receives the application update request.

At step 308, AS 150 determines an application update status for the user associated with the application update request. The AS 150 determines the user associated with the application update request from information included within the application update request. The application update status may depend on the type of application of AS 150.

For example, for application content polling, the application update status may include an indication as to whether or not there is any new content available for the user (e.g., since the last application polling request).

For example, for application keep-alive messaging, the application update status may include an indication as to whether or not the connection for the user is still active on AS 150.

It will be appreciated that the application update status may include other types of statuses depending on factors such as the type of application, the preferences of the user for the application, and the like, as well as various combinations thereof.

At step 310, AS 150 sends an application update response to AP 130.

The application update response is adapted for enabling AP 130 to interact with AS 150 on behalf of MD 110. The application update response is associated with the application hosted on AS 150 and available on MD 110 (i.e., associated with the corresponding application client 112 of MD 110). The application update response is received by the network application API 132 of AP 130 that initiated the application update request. The application update response is adapted for indicating to AP 130 that the response is associated with the user of MD 110 and, optionally, that the application update response is associated with the application update request initiated by AP 130 on behalf of the user.

The application update response is processed by AP 130 such that (1) the application update response does not necessarily have to be transported via RAN 120 (e.g., unless the application update response is determined to require initiation of an application update notification to MD 110 as in steps 314-320), thereby reducing application update traffic transported via RAN 120, and (2) the application update response does not necessarily have to be processed by MD 110 (e.g., unless the application update response is determined to require initiation of an application update notification to MD 110 as in steps 314-320), thereby reducing consumption of resources on MD 110 required for enabling MD 110 to utilize the application.

At step 312, AP 130 receives the application update response.

At step 314, a determination is made as to whether to update the user for the application. If a determination is made not to update the user, method 300 proceeds to step 322, where method 300 ends. If a determination is made to update the user, method 300 proceeds to step 316.

The determination as to whether to update the user is made based on the application update response.

In one embodiment, for example, in which application update functions performed by AP 130 are performed for application content polling, the determination as to whether or not to update the user is a determination as to whether or not there is any new content available for the user (e.g., since the last application polling request). If there is no new content available for the user, the user is not updated (i.e., method 300 proceeds to step 322). If there is new content available for the user, the user is updated (i.e., method 300 proceeds to step 316).

In one embodiment, for example, in which application update functions performed by AP 130 are performed for application keep-alive messaging, the determination as to whether or not to update the user is a determination as to whether or not the connection for the user is still active on AS 150.

In one such embodiment, if the connection for the user is still active on AS 150 then the user is not updated (i.e., method 300 proceeds to step 322, where method 300 ends), and if the connection for the user is not still active on AS 150 then the user is updated (i.e., method 300 proceeds to step 316). In this case, as long as MD 110 does not receive an application update notification from AP 130, MD 110 knows that the connection is still active on AS 150. In this embodiment, the application update traffic is virtually eliminated from the RAN 120 in both directions of transmission (since the only application update notification sent to MD 110 is sent when the connection is no longer active).

In another such embodiment, if the connection for the user is not still active on AS 150 then the user is not updated (i.e., method 300 proceeds to step 322, where method 300 ends), and if the connection for the user is still active on AS 150 then the user is updated (i.e., method 300 proceeds to step 316). In this case, as long as MD 110 continues to receive application update notifications from AP 130, MD 110 is aware that the connection is still active on AS 150 (and when it does not receive an application update message from AP 130, it knows that the connection is no longer active). In this embodiment, although application update traffic in the direction from the AP 130 to MD 110 must be transported by RAN 120, the application update traffic is virtually eliminated from the RAN 120 in the direction from the MD 110 to the AP 130, which still provides a significant reduction in the overall application update traffic transported by RAN 120.

At step 316, AP 130 sends an application update notification to the MD 110. The application update notification is sent from AP 130 to the MD 110 via RAN 120. The application update notification is adapted for indicating, to the user, an update for the user at AS 150.

In one embodiment, for example, in which application update functions performed by AP 130 are performed for application content polling, the application update notification provides an indication that there is new content available for the user. In one embodiment, the new content is provided to the MD 110 in the application update notification, thereby ensuring that new content is delivered to the user quickly and, further, obviating a need for MD 110 to initiate a request to receive the new content (and, thus, further reducing the amount of application update traffic that must be transported by RAN 120). In one embodiment, a subset of the new content is provided to the MD 110 in the application update notification or none of the new content is provided to the MD 110 in the application update notification, in which case MD 110 initiates a request to receive the new content available on AS 150. The request for new content initiated by MD 110 may be initiated in any suitable manner.

In one embodiment, for example, in which application update functions performed by AP 130 are performed for application keep-alive messaging, the application update notification may be adapted to provide an indication that the connection is still active or to provide an indication that the connection is no longer active (e.g., depending on the type of application update notification scheme that is employed for keep-alive messaging, as described with respect to step 316).

At step 318, MD 110 receives the application update notification. The application update notification is received by the client notification API 113 of the client application 112 for which method 300 is being executed.

At step 320, MD 110 processes the application update notification. The client application 112 of MD 110 processes the application update notification. The processing of the application update notification by the client application 112 of MD 110 may depend on one or more factors, such as the type of application of the application update notification, the type of information included within the application update notification, and the like, as well as various combinations thereof.

In one embodiment, for example, in which the application update notification is associated with application content polling, the application update notification provides an indication that there is new content available for the user. In one embodiment, in which the application update notification includes the new content, processing of the application update notification includes extracting and presenting the new content via the application interface. In one embodiment, in which the application update notification includes only a subset of the new content, processing of the application update notification includes extracting and presenting the new content via the application interface and initiating an application content request for obtaining the remainder of the new content available at AS 150 for the user. In one embodiment, in which the application update notification does not include any of the new content, processing of the application update notification includes initiating an application content request for obtaining the new content available at AS 150 for the user. Other types of processing may be performed either in place of or in addition to the described processing types.

In one embodiment, for example, in which the application update notification is associated with application keep-alive messaging, the application update notification may provide an indication that the connection is no longer active or an indication that the connection is still active. In one embodiment, in which the application update notification provides an indication that the connection is no longer active, processing of the application update notification may include one or more of presenting a status message to the user via at least one user interface of MD 110, presenting an option for enabling the user to manually select re-initiation of a connection with AS 150, automatically re-initiating a connection with AS 150 (e.g., via AP 130 or bypassing AP 130), and the like, as well as various combinations thereof. In one embodiment, in which the application update notification provides an indication that the connection is still active, processing of the application update notification may include one or more of ignoring the application update notification, updating status information associated with the connection, presenting status information associated with the connection via at least one user interface of MD 110, and the like, as well as various combinations thereof. Other types of processing may be performed either in place of or in addition to the described processing types.

At step 322, method 300 ends.

Although depicted and described as ending (for purposes of clarity), it will be appreciated that the method 300 may continue to be repeated. For example, as long as the client application 112 of MD 110 remains registered with the associated network application API 132 of AP 130 and the network application API 132 of AP 130 remains registered with the AS 150 on behalf of MD 110, AP 130 continues to send application update requests to AS 150 (i.e., method 300 is repeated for each application update request initiated by AP 130 on behalf of MD 110). In this manner, MD 110 continues to be provided with the latest application status information for the application for which method 300 is performed.

Although omitted for purposes of clarity, it will be appreciated that, for at least some applications that utilize keep-alive messages and for which a middle-box device is present between AP 130 and AS 150, the application update request (steps 304/306) and application update response (steps 310/312) also will traverse the middle-box device and, thus, may be used to indicate to a middle-box device that the state of the connection between MD 110 and AS 150 should be maintained by the middle-box device. In such embodiments, updating of the MD 110 based on the application update response (e.g., steps 314-320) may be performed in a manner similar to updating of the MD 110 described herein when the keep-alive messages are used for maintaining the connection on the AS 150.

In one embodiment, the network application APIs for an application (e.g., where multiple network application APIs are deployed on multiple networks for a given AS 150) are configured to support application state migration, such that the application update traffic reduction capability is not impacted by the mobility of the users. In one such embodiment, for example, a network application API 132 of an AP 130 that is deployed in a particular network is configured to periodically broadcast discovery messages adapted for use in identifying users that are registered with the network application API 132 of the AP 130 that is deployed in the network, but which are not currently located on that network in which the AP 130 is deployed (i.e., for identifying any users that now have wireless access through other networks while still being registered with the network API 132 of the AP 130 deployed in the network). In one such embodiment, upon identification of such a user by the network API 132 (i.e., the user is currently located on a different network), the network application API 132 transfers the application state of the user to a corresponding network application API 132 on an AP 130 deployed in the different network on which the user is currently located. For example, in a CDMA wireless communication network that includes multiple PDSNs, the application state of a user may be transferred from one PDSN associated with a RAN previously accessed by the user to another PDSN associated with a RAN currently accessed by the user. For example, in a 3G UMTS wireless communication network that includes multiple SGSNs, the application state of a user may be transferred from one SGSN associated with a RAN previously accessed by the user to another SGSN associated with a RAN currently accessed by the user. The application state migrations which may be performed in other types of wireless communication networks will be understood by way of reference to the description of FIG. 1. Although primarily described with respect to a single network application API, it will be appreciated that such capabilities may be supported by any network application APIs utilized for supporting of any numbers and/or types of ASs 150.

Although primarily depicted and described herein with respect to embodiments in which MD 110 is assumed to have a single user using the MD 110, it will be appreciated that in some cases the MD 110 may be used by multiple users. In some cases, the multiple users may share one or more of the applications. In some cases, the multiple users may access and use one or more of the applications independently from each other. Accordingly, it will be appreciated that references herein to functions being performed on behalf of MD 110 may also be and/or alternatively be considered to be indicating that functions are performed on behalf of a single user, multiple users, and the like. It will be appreciated that, in the case of multiple users using MD 110, at least some of the functions still may be considered to be performed on behalf of the MD 110 (e.g., where certain functions for certain applications are initiated automatically by the MD 110 on behalf of the user(s)).

Although primarily described with respect to utilizing the application update traffic reduction capability within cellular communication networks, it will be appreciated that the application update traffic reduction capability may be utilized within various other types wireless communication networks. Similarly, although primarily described with respect to utilizing the application update traffic reduction capability within wireless communication networks, it will be appreciated that the application update traffic reduction capability also may be utilized within wireline communication networks.

Figure 4:
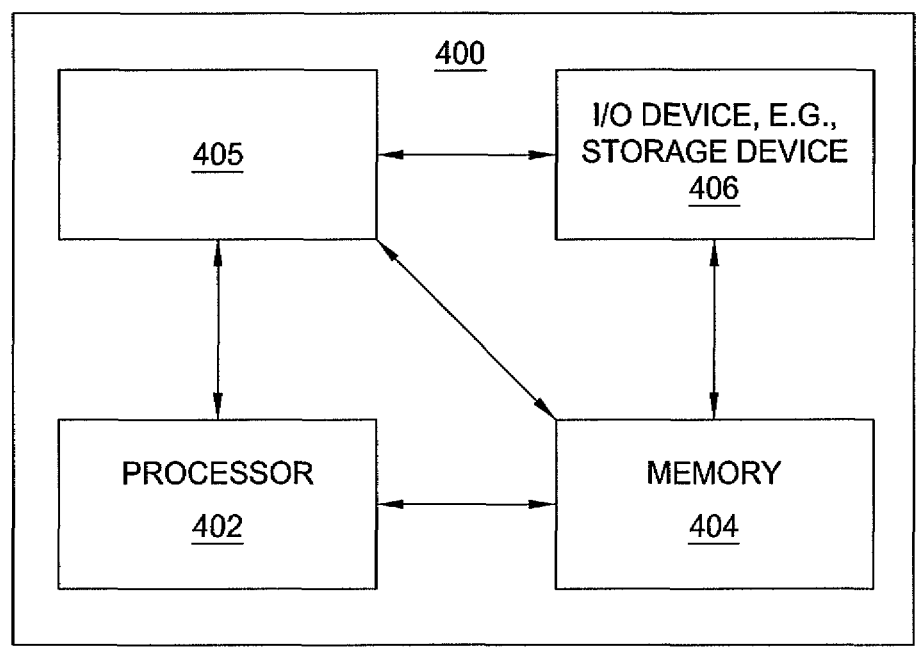
FIG. 4 depicts a high-level block diagram of a computer suitable for use in performing the functions described herein.

FIG. 4 depicts a high-level block diagram of a computer suitable for use in performing the functions described herein. As depicted in FIG. 4, computer 400 includes a processor element 402 (e.g., a central processing unit (CPU), two or more co-processors, and/or other suitable processor(s)), a memory 404 (e.g., random access memory (RAM), read only memory (ROM), and the like), an application update traffic reduction module/process 405, and various input/output devices 406 (e.g., a user input device (such as a keyboard, a keypad, a mouse, and the like), a user output device (such as a display, a speaker, and the like), an input port, an output port, a receiver, a transmitter, and storage devices (e.g., a tape drive, a floppy drive, a hard disk drive, a compact disk drive, and the like)).

It will be appreciated that the functions depicted and described herein may be implemented in software, hardware, and/or a combination of software and hardware, e.g., using a general purpose computer, one or more application specific integrated circuits (ASIC), and/or any other equivalents. In one embodiment, application update traffic reduction process 405 can be loaded into memory 404 and executed by processor 402 to implement the functions as discussed hereinabove. As such, application update traffic reduction process 405 (including associated data structures) can be stored on a computer readable storage medium, e.g., RAM memory, magnetic or optical drive or diskette, and the like.

It is contemplated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media, transmitted via a data stream in a broadcast or other signal bearing medium, and/or stored within a memory within a computing device operating according to the instructions.

Aspects of various embodiments are specified in the claims. Those and other aspects of various embodiments are specified in the following numbered clauses:

1. A method for reducing application update traffic in a network, the method comprising:

transmitting, from an application proxy toward an application server, an application update request message associated with an application supported by the application server and available on a user device, wherein the application update message is transmitted by the application proxy on behalf of the user device;

receiving, at the application proxy, an application update response message of the application server; and determining, based on the application update response message, whether to transmit an application update notification message toward the user device.

2. The method of clause 1, wherein the application update request message comprises at least one of a polling message and a keep-alive message.

3. The method of clause 2, wherein the polling message is adapted for polling the application server for determining whether new application content is available on the application server for the user.

4. The method of clause 3, wherein the application update response message is indicative of whether new application content is available on the application server for a user of the user device.

5. The method of clause 2, wherein the keep-alive message is adapted for at least one of:
indicating to a middle-box device that the state of the connection between the user device and the application server should be maintained by the middle-box device, wherein the middle-box device is located between the user device and the application server.

6. The method of clause 5, wherein the application update response message is indicative of whether the state of the connection is active on the middle-box device.

7. The method of clause 2, wherein the keep-alive message is adapted for indicating to the application server that a connection should be maintained on the application server for a user of the user device.

8. The method of clause 7, wherein the application update response message is indicative of whether the connection is active for the user device on the application server.

9. The method of clause 1, further comprising:
in response to a determination not to send the application update notification message toward the user device, dropping the application update response message received from the application server.

10. The method of clause 1, further comprising:
in response to a determination to send the application update notification message toward the user device, sending the application update notification message toward the user device.

11. The method of clause 10, wherein sending the application update notification message toward the user device comprises one of:
forwarding the application update response message toward the user device; and
generating an application update notification message based on the application update response message and sending the generated application update notification message toward the user device.

12. The method of clause 1, wherein the application comprises at least one of an email application, an instant messaging (IM) application, a social networking application, a Really Simple Syndication (RSS) application, a virtual private network (VPN) application, and a mobility application.

13. The method of clause 1, further comprising:
prior to transmitting the application update request message, receiving at the application proxy, from the user device, a request to register with the application proxy, wherein the registration request is associated with the application.

14. The method of clause 13, further comprising:
transmitting, from the application proxy toward the application server, a proxy registration request for registering a user of the user device with the application server;
receiving, at the application proxy from the application server, a proxy registration response indicative as to whether the user was registered with the application server; and
transmitting, from the application proxy toward the user device, an application registration response indicative as to whether the user was registered with the application server.

15. An apparatus for reducing application update traffic in a network, comprising:
means for transmitting, from an application proxy toward an application server, an application update request message associated with an application supported by the application server and available on a user device, wherein the application update message is transmitted by the application proxy on behalf of the user device;
means for receiving, at the application proxy, an application update response message of the application server; and
means for determining, based on the application update response message, whether to transmit an application update notification message toward the user device.

16. A method for reducing update traffic in a network, the method comprising:
preventing, at a user device, transmission of an application update request message that would normally be transmitted from the user device to an application server for an application supported by the application server and available on the user device.

17. The method of clause 16, further comprising:
prior to preventing transmission of the application update request message:
transmitting, from the user device toward an application proxy, a registration request message for registering the user device with the application proxy for the application, wherein the application proxy is configured to communicate with the application server for the application on behalf of the user device.

18. The method of clause 17, wherein the user device is configured to prevent transmission of an application update request message in response to transmission of the registration request message.

19. The method of clause 18, further comprising:
in response to receiving a registration response message indicative that the user device is not registered with the application proxy for the application:
enabling transmission, by the user device, of an application update request message for the application.

20. The method of clause 17, wherein the user device is configured to prevent transmission of an application update request message in response to receiving a registration response message indicative that the user device is registered with the application proxy for the application.

21. The method of clause 16, wherein the user device comprises an application client for running the application on the user device, wherein preventing transmission of the application update request message comprises:
configuring the application client to prevent transmission of the application update request message toward the application server.

22. The method of clause 16, further comprising:
receiving, at the user device from an application proxy, an application update response message associated with the application.

23. The method of clause 22, wherein the application update response message comprises new content available from the application server for a user of the user device.

24. The method of clause 22, further comprising:
transmitting, from the user device toward the application server, an application content request message adapted for requesting new content available from the application server for a user of the user device.

25. The method of clause 16, wherein the application update request message comprises at least one of a polling message and a keep-alive message.

26. The method of clause 25, wherein the polling message is adapted for polling the application server for determining whether new content is available for a user of the user device.

27. The method of clause 25, wherein the keep-alive message is adapted for at least one of:

indicating to a middle-box device that the state of the connection between the user device and the application server should be maintained by the middle-box device, wherein the middle-box device is located between the user device and the application server; and indicating to the application server that a connection should be maintained on the application server for a user of the user device.

28. The method of clause 16, wherein the application comprises at least one of an email application, an instant messaging (IM) application, a social networking application, a Really Simple Syndication (RSS) application, a virtual private network (VPN) application, and a mobility application.

29. An apparatus for reducing application update traffic in a network, comprising:
    a memory; and
    a processor for preventing transmission of an application update request message that would normally be transmitted from the user device to an application server for an application supported by the application server and available on the user device.

Although various embodiments which incorporate the teachings of the present invention have been shown and described in detail herein, those skilled in the art can readily devise many other varied embodiments that still incorporate these teachings.

What is claimed is:

1. A method for managing traffic in a network, the method comprising:
    receiving, at a middlebox device comprising a processor and disposed on a network communication path between a user device and a Virtual Private Network (VPN) server, a keep-alive message associated with a VPN connection between a VPN client of the user device and the VPN server, wherein the middlebox device is disposed between a proxy server and the VPN server on the network communication path and the proxy server is disposed between the user device and the middlebox device on the network communication path, wherein a portion of the network communication path between the user device and the proxy server comprises a wireless access network, wherein the keep-alive message is received from the proxy server, wherein the proxy server is configured to transmit the keep-alive message toward the VPN server on behalf of the VPN client of the user device for reducing traffic on the wireless access network; and
    resetting a timer associated with the VPN connection at the middlebox device based on the received keep-alive message.

2. The method of claim 1, further comprising:
    maintaining, at the middlebox device, a state of the VPN connection between the VPN client of the user device and the VPN server.

3. The method of claim 1, further comprising:
    maintaining the timer associated with the VPN connection between receipt of the keep-alive message and receipt of a next keep-alive message associated with the VPN connection; and
    resetting the timer associated with the VPN connection based on receipt of the next keep-alive message associated with the VPN connection.

4. The method of claim 1, wherein the VPN server maintains the VPN connection for the user device.

5. The method of claim 1, wherein the keep-alive message is a User Datagram Protocol (UDP) based keep-alive message.

6. An apparatus for managing traffic in a network, the apparatus comprising:
    a processor and a memory communicatively connected to the processor, the processor configured to:
        receive, via a network communication path between a user device and a Virtual Private Network (VPN) server, a keep-alive message associated with a VPN connection between a VPN client of the user device and the VPN server, wherein the apparatus is configured to be disposed between a proxy server and the VPN server on the network communication path and the proxy server is configured to be disposed between the user device and the apparatus on the network communication path, wherein a portion of the network communication path between the user device and the proxy server comprises a wireless access network, wherein the keep-alive message is received from the proxy server, wherein the proxy server is configured to transmit the keep-alive message toward the VPN server on behalf of the VPN client of the user device for reducing traffic on the wireless access network; and
        reset a timer associated with the VPN connection based on the received keep-alive message.

7. The apparatus of claim 6, wherein the processor is configured to:
    maintain a state of the VPN connection between the VPN client of the user device and the VPN server.

8. The apparatus of claim 6, wherein the processor is configured to:
    maintain the timer associated with the VPN connection between receipt of the keep-alive message and receipt of a next keep-alive message associated with the VPN connection; and
    reset the timer associated with the VPN connection based on receipt of the next keep-alive message associated with the VPN connection.

9. The apparatus of claim 6, wherein the VPN server maintains the VPN connection for the user device.

10. The apparatus of claim 6, wherein the keep-alive message is a User Datagram Protocol (UDP) based keep-alive message.

11. A method for managing traffic in a network, the method comprising:
    transmitting, from a proxy server toward a Virtual Private Network (VPN) server, a keep-alive message associated with a VPN connection between a VPN client of a user device and the VPN server, wherein the proxy server is disposed between the user device and a middlebox device on the network communication path and the middlebox device is disposed between the proxy server and the VPN server on the network communication path, wherein a portion of the network communication path between the user device and the proxy server comprises a wireless access network, wherein the proxy server transmits the keep-alive on behalf of the VPN client of the user device for reducing traffic on the wireless access network; and
    receiving, at the proxy server, a keep-alive response message from the VPN server.

12. The method of claim 11, further comprising:
    propagating the keep-alive message from the proxy server to the VPN server via the middlebox device.

13. The method of claim 12, wherein the middlebox device maintains a state of the VPN connection between the VPN client of the user device and the VPN server and maintains a timer associated with the VPN connection.

14. The method of claim 11, wherein the VPN server maintains the VPN connection for the user device.

15. The method of claim 11, wherein the keep-alive message is a User Datagram Protocol (UDP) based keep-alive message.

16. An apparatus for managing traffic in a network, the apparatus comprising:
a processor and a memory communicatively connected to the processor, the processor configured to:
transmit, toward a Virtual Private Network (VPN) server, a keep-alive message associated with a VPN connection between a VPN client of a user device and the VPN server, wherein the apparatus is configured to be disposed between the user device and a middlebox device on the network communication path and the middlebox device is configured to be disposed between the apparatus and the VPN server on the network communication path, wherein a portion of the network communication path between the user device and the apparatus comprises a wireless access network, wherein the processor is configured to transmit the keep-alive message on behalf of the VPN client of the user device for reducing traffic on the wireless access network; and
receive a keep-alive response message from the VPN server.

17. The apparatus of claim 16, wherein the processor is configured to:
propagate the keep-alive message to the VPN server via the middlebox device.

18. The apparatus of claim 17, wherein the middlebox device maintains a state of the VPN connection between the VPN client of the user device and the VPN server and maintains a timer associated with the VPN connection.

19. The apparatus of claim 16, wherein the VPN server maintains the VPN connection for the user device.

20. The apparatus of claim 16, wherein the keep-alive message is a User Datagram Protocol (UDP) based keep-alive message.

\* \* \* \* \*